United States Patent
Wiste

(10) Patent No.: US 7,137,204 B2
(45) Date of Patent: Nov. 21, 2006

(54) WIRE TOOL SYSTEM AND METHOD

(76) Inventor: Rodney J. Wiste, 205 S. Beach Dr., Altoona, WI (US) 54720

( * ) Notice: Subject to any disclaimer, the term of this patent is extended or adjusted under 35 U.S.C. 154(b) by 40 days.

(21) Appl. No.: 10/946,716

(22) Filed: Sep. 22, 2004

(65) Prior Publication Data

US 2006/0059691 A1  Mar. 23, 2006

(51) Int. Cl.
*B21F 11/00* (2006.01)
*B21F 13/00* (2006.01)

(52) U.S. Cl. .......................... 30/90.1; 30/113
(58) Field of Classification Search ................ 30/90.1, 30/90.8, 91.2, 113; 81/9.4, 9.44
See application file for complete search history.

(56) References Cited

U.S. PATENT DOCUMENTS

| | | | | |
|---|---|---|---|---|
| 715,315 | A * | 12/1902 | Steinecke | 30/113 |
| 1,043,363 | A * | 11/1912 | Schickerling | 30/113 |
| 1,314,759 | A * | 9/1919 | Silvernail | 30/90.1 |
| 2,738,479 | A | 3/1956 | Gibson | |
| 2,770,989 | A | 11/1956 | Bologno | |
| 2,995,052 | A | 8/1961 | Funcik | |
| 3,114,277 | A | 12/1963 | Clendenin | |
| 3,713,215 | A | 1/1973 | Van Dalen et al. | |
| 3,769,705 | A | 11/1973 | Biddle | |
| 4,366,619 | A | 1/1983 | Bieganski | |
| 4,526,068 | A | 7/1985 | Undin et al. | |
| 4,640,009 | A | 2/1987 | Liversidge | |
| D297,210 | S | 8/1988 | Liversidge | |
| 4,805,302 | A | 2/1989 | Steiner | |
| 5,009,130 | A | 4/1991 | Bieganski | |
| 5,398,413 | A * | 3/1995 | Chen | 30/90.1 |
| 5,715,602 | A * | 2/1998 | Hage | 30/113 |
| 5,893,212 | A * | 4/1999 | Meister | 30/113 |
| 6,058,606 | A | 5/2000 | Hepworth | |
| 6,076,260 | A * | 6/2000 | Williamson, IV | 30/113 |
| 6,161,289 | A | 12/2000 | Alexander | |
| 6,164,286 | A * | 12/2000 | Schad | 131/248 |
| 6,234,050 | B1 | 5/2001 | Konen et al. | |
| 6,334,253 | B1 | 1/2002 | Cheng | |
| 6,418,817 | B1 | 7/2002 | Brown | |
| 6,473,925 | B1 | 11/2002 | Konen | |
| 6,510,611 | B1 | 1/2003 | Edwards et al. | |
| 6,530,099 | B1 | 3/2003 | Iwinski | |
| 6,588,039 | B1 | 7/2003 | Bates | |
| 6,618,885 | B1 | 9/2003 | Blaustein | |
| D481,607 | S * | 11/2003 | Ahlgren et al. | D8/98 |
| 6,691,403 | B1 | 2/2004 | Murg | |
| 2003/0110637 | A1 | 6/2003 | Tapper | |
| 2003/0188433 | A1* | 10/2003 | Yu | 30/113 |

* cited by examiner

*Primary Examiner*—Hwei-Siu Payer
(74) *Attorney, Agent, or Firm*—Fredrikson & Byron, P.A.

(57) ABSTRACT

The invention comprises a tool useful for the manipulation of a wire. The tool includes a first body portion, a second body portion substantially translationally coupled to the first body portion, and a wire engaging member. The wire engaging member has a first section partially carried on the first body portion and a second section partially carried on the second body portion. The first and second sections of the wire engaging member exert compressive force on the wire when the first body portion and the second body portion are translated towards each other.

2 Claims, 7 Drawing Sheets

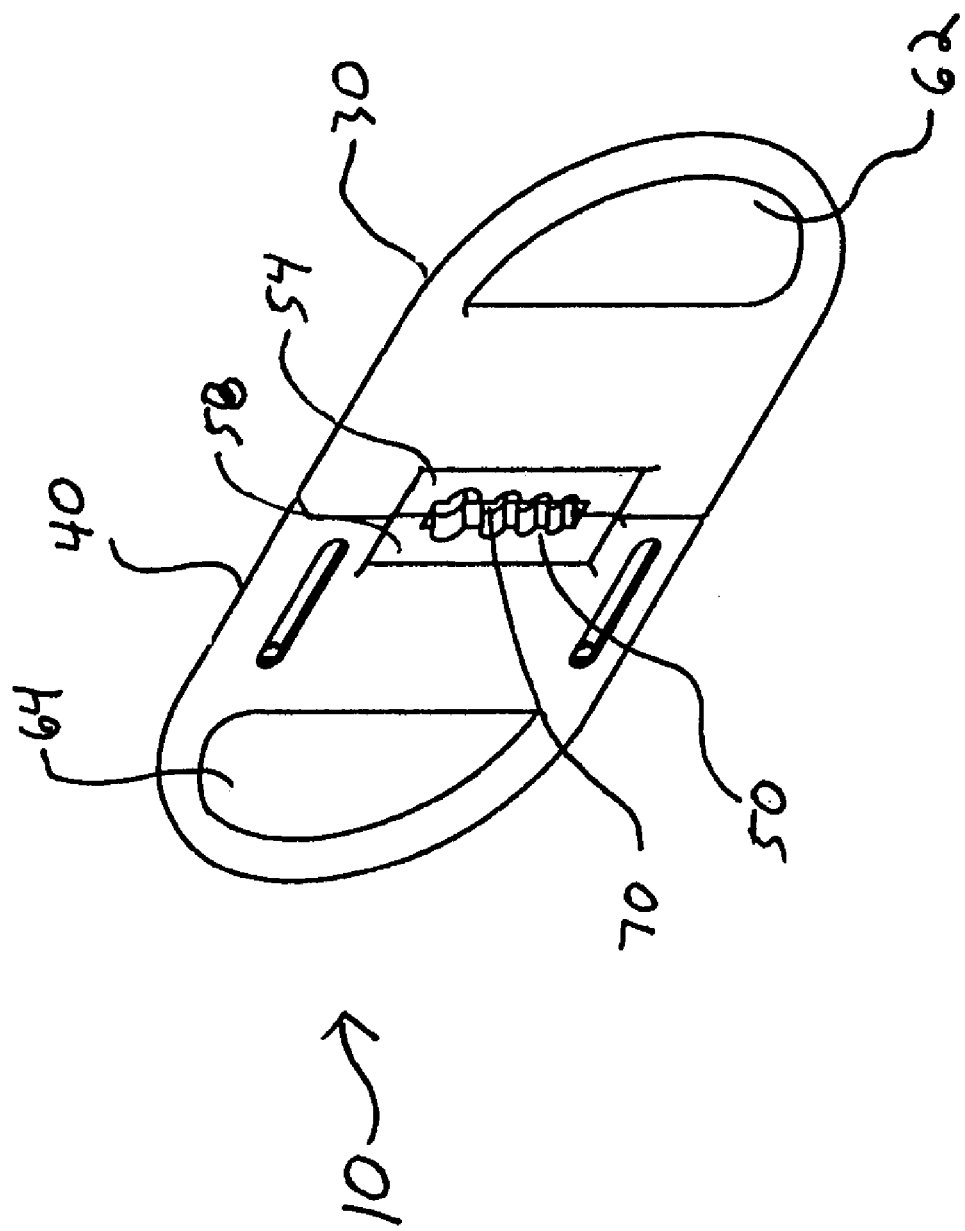

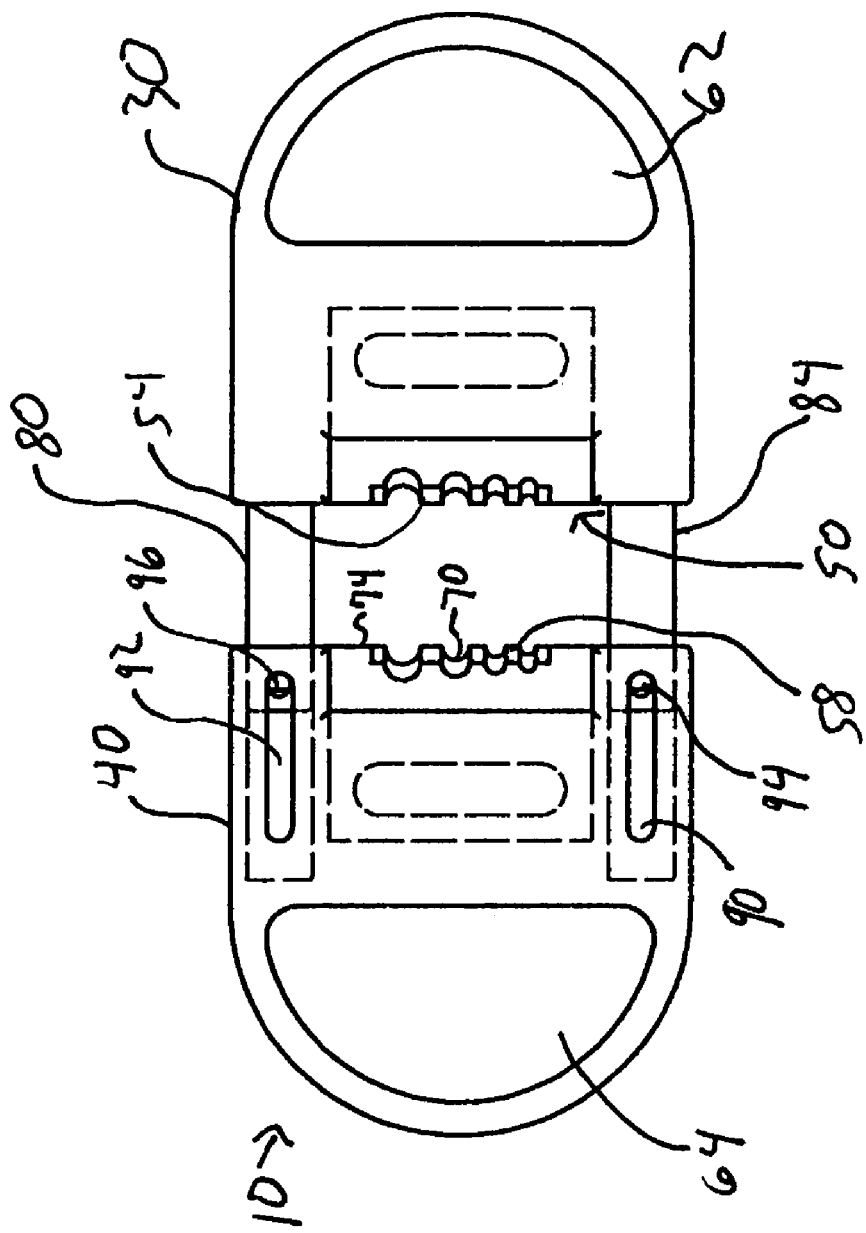

WIRE TOOL SYSTEM AND METHOD

FIELD OF THE INVENTION

The present invention relates to a wire tool, and more particularly to a wire tool useful for performing a work function on a wire in a relatively confined space.

BACKGROUND OF THE INVENTION

Wire tools, such as wire cutters and strippers, are used in a variety of settings. For example, wire tools are used for installing audio equipment in an automobile. When installing such equipment, many of the wires must be cut or stripped while under the dashboard or other relatively confined space.

Traditional wire tools are not suitable for this environment. For example, pivotable pliers style wire tools are not easily manipulated with one hand and require too much room to operate to be useful in a small space. Further, existing non-pivotable wire tools are not designed to allow a user to exert maximum force with one hand, and/or are not provided with features that allow wires of multiple sizes to be stripped and/or cut. Such deficiencies render such tools undesirable for use in a small space, such as under a dashboard.

BRIEF SUMMARY OF THE INVENTION

The invention comprises a wire tool useful for the manipulation of a wire, such as by cutting or stripping. A tool in accordance with the present invention is particularly suitable for use with one hand. Such a tool is also particularly suitable for use in a relatively small space, such as underneath a dashboard of an automobile.

In some embodiments, the tool of the present invention includes a first body portion, a second body portion substantially translationally coupled to the first body portion, and a wire engaging member. The wire engaging member has a first section partially carried on the first body portion and a second section partially carried on the second body portion, where the first and second sections of the wire engaging member exert compressive force on the wire when the first body portion and the second body portion are translated towards each other. The wire engaging member can be configured to perform any work function on the wire (e.g., stripping a sheath off the wire and/or severing the wire). The invention also includes a method of performing a work function on a wire with a tool such as the one described above.

BRIEF DESCRIPTION OF THE DRAWINGS

FIG. 1A shows a perspective view of a wire tool in accordance with an embodiment of the present invention.

FIG. 2A shows a front plan view of a wire tool in accordance with an embodiment of the present invention.

DETAILED DESCRIPTION OF THE INVENTION

The following detailed description should be read with reference to the drawings, in which like elements in different drawings are numbered identically. The drawings, which are not necessarily drawn to scale, depict selected embodiments and are not intended to limit the scope of the invention. It will be understood that embodiments shown in drawings and described are merely for illustrative purposes and are not intended to limit the scope of the embodiments as defined in the claims that follow.

Figure 1B:
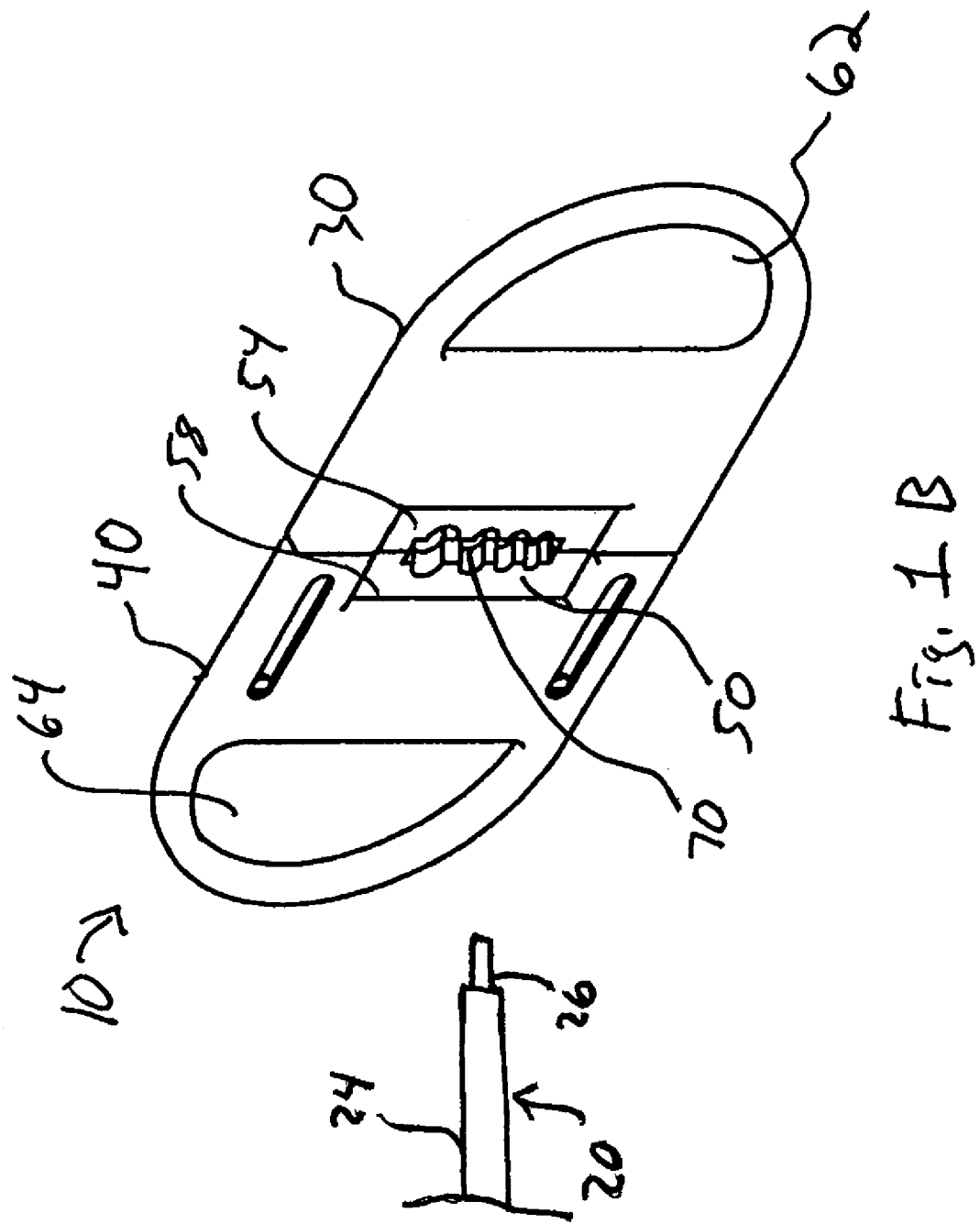
FIG. 1B shows a perspective view of a wire tool and wire in accordance with an embodiment of the present invention.
Figure 2B:
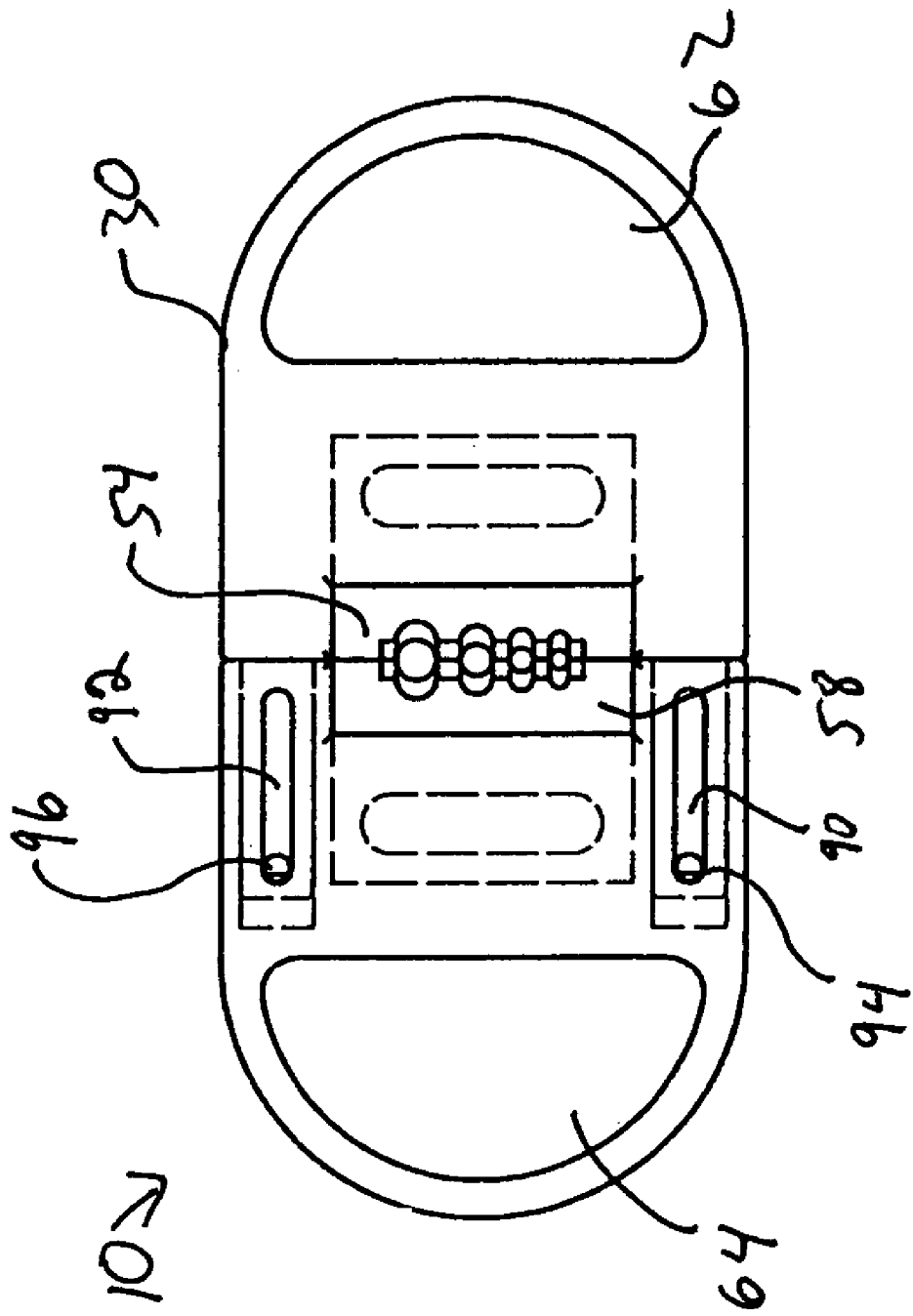
FIG. 2B shows a front plan view of a wire tool in accordance with an embodiment of the present invention.
Figure 3:
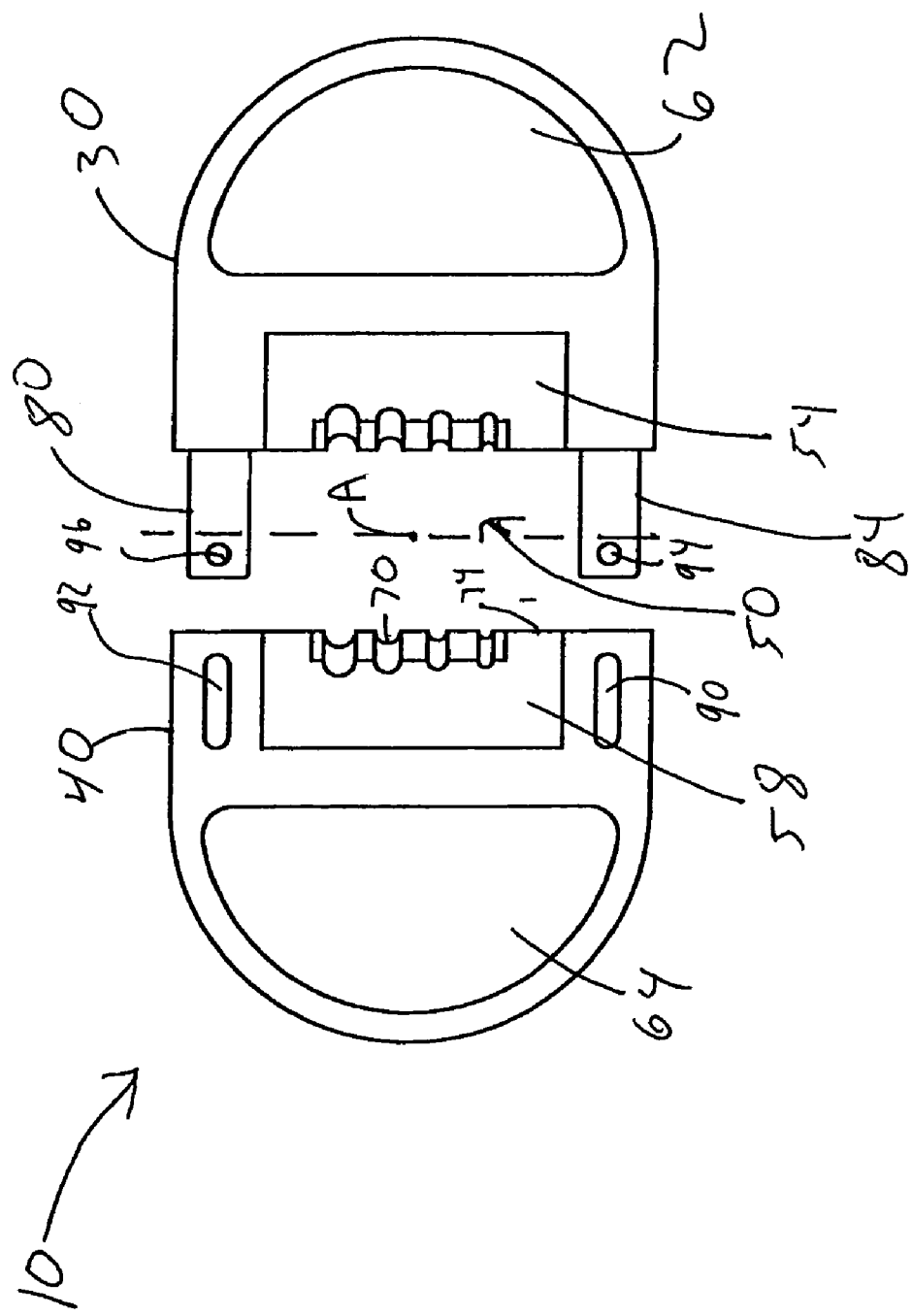
FIG. 3 shows an exploded front plan view of a wire tool in accordance with an embodiment of the present invention.

As shown in FIGS. 1A and 1B, the invention comprises a tool 10 useful for manipulation of a wire 20, such as by stripping a sheath 24 from a wire core 26, or severing the wire 20 (e.g., cutting it into two or more pieces). Tool 10 may be used with any type of wire 20, such as a copper wire surrounded by an insulting plastic sheath, and is particularly suitable for use on wires commonly found in audio equipment.

Figure 4:
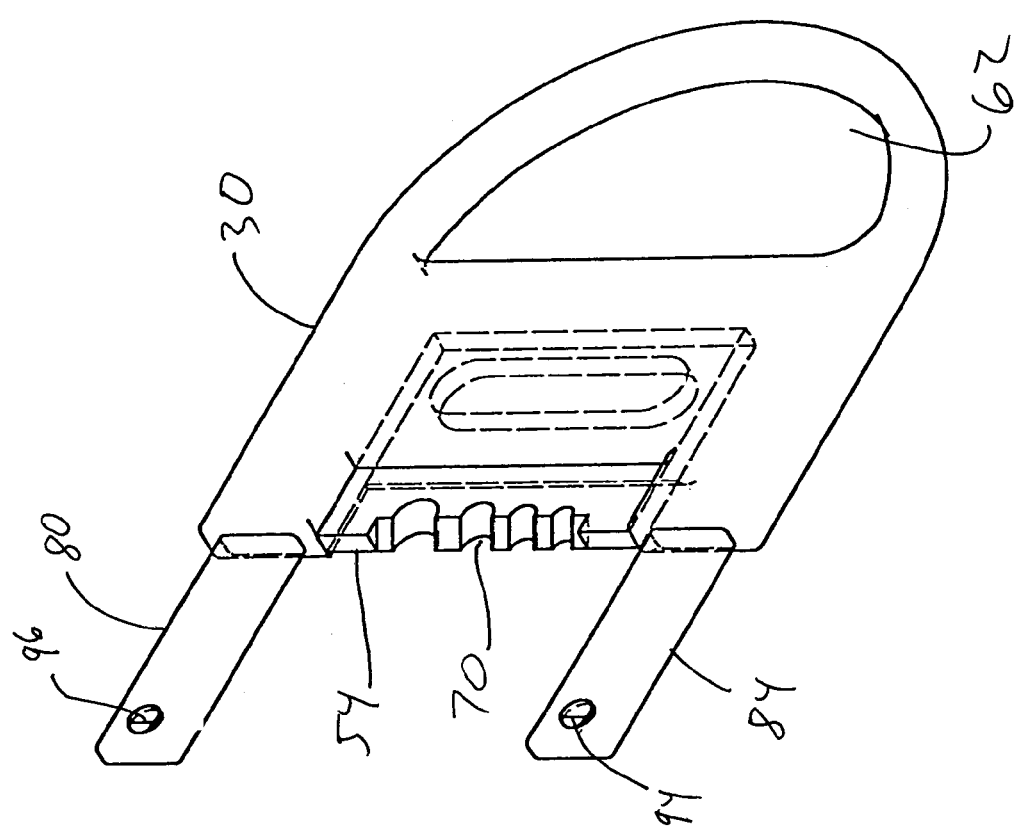
FIG. 4 shows a perspective view of a first body portion in accordance with an embodiment of the present invention.
Figure 5:
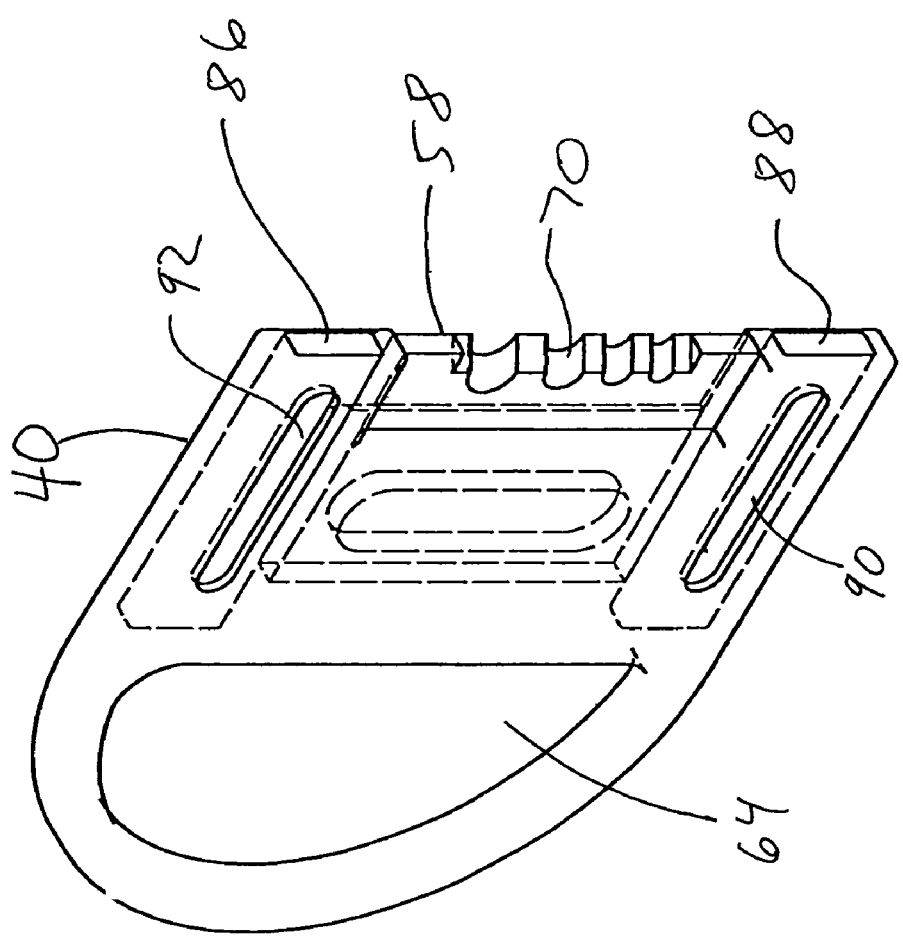
FIG. 5 shows a perspective view of a second body portion in accordance with an embodiment of the present invention.

In some embodiments, as shown in FIGS. 1A–3, the tool 10 includes a first body portion 30 (as emphasized in FIG. 4) and a second body portion 40 (as emphasized in FIG. 5). First and second body portions 30, 40 may be formed of any suitable material, such as a polymer or metal. Further, in some embodiments the first and second body portions 30, 40 are substantially equivalent, that is, they are substantially mirror images of each other (excluding the features that provide for translational movement). First body portion 30 and second body portion 40 may be substantially translationally coupled to each other from a first position as shown in FIG. 2A to a second position as shown in FIG. 2B. Translation, as opposed to rotation or pivotal motion, may be defined as motion of a body in which every point of the body moves parallel to, and the same distance as, every other point on the body. Stated alternatively, tool 10 operates with a guillotine action. Such a guillotine action provides several benefits over the prior art. For example, it facilitates the utilization of tool 10 with one hand. In addition, this feature allows for tool 10 to be operated in a confined space, such as under the dash of a car, because the tool 10 takes substantially less room to operate than traditional pivotable style wire tools.

Tool 10 also includes a wire engaging member 50. Wire engaging member 50 is useful for engaging wire 20 to perform a work function, such as stripping sheath 24 or severing the wire 20, and is preferably formed of metal. Wire engaging member 50 may have a first section 54 partially carried on the first body portion 30, and a second section 58 partially carried on the second body portion 40. This feature allows first and second sections 54, 58 of the wire engaging member 50 to translate towards one another to exert compressive force on the wire 20 when the first body portion 30 and the second body portion 40 are translated towards each other. Thus, a user may engage a wire 20 by squeezing first and second body portions 30, 40 together with one hand. This design is advantageous over other styles of wire tools because a person can generally apply more force with one hand by squeezing pieces together verses pulling pieces apart. It also provides the user with greater control over the tool 10 and contributes to the tool's usefulness in confined spaces. In some embodiments of the invention, wire engaging member 50 is formed with first and second body portions 30, 40. In other embodiments, first and second sections 54, 56 formed separately from, and are attached to, first and second body portions 30, 40, respectively.

In some embodiments, the first body portion 30 defines a first aperture 62 and the second body portion 40 defines a second aperture 64. Such first and second apertures are useful for manual engagement of the first and second body portions 30, 40. In these embodiments, a user may grasp first and/or second apertures 62, 64 to provide for greater control over tool 10 while translating first body portion 30 and second body portion 40 toward and away from each other.

The wire engaging member 50 may be provided with any feature that is useful for performing a work function on wire 20. In some embodiments, wire engaging member 50 defines one or more wire receiving apertures 70 useful for engaging wire 20. Such wire receiving apertures 70 can be sized to receive a specific diameter of wire. The diameter of the wire received, and the number of wire receiving apertures 70 provided, will depend on the size of the tool 10 and the wire engaging member 50. Wire engaging member 50 may also define a cutting portion 74. Cutting portion 74 may be formed by sharpening some or all of wire engaging member 50. In some embodiments, a plurality of wire receiving apertures 70 and a cutting portion 74 are both provided on wire engaging member 50. Further, in some embodiments the first and second sections 54, 58 of the wire engaging member 50 define a plurality of apertures about the longitudinal center line of the tool 10 (as shown by line A in FIG. 3) when the first and second sections 54, 58 are placed in apposition. In such embodiments, each section may define about one-half of the aperture.

First body portion 30 and second body portion 40 may be translationally coupled to each other by any suitable means. In some embodiments, first body portion 30 and second body portion 40 are translationally coupled to one another by a first translating member 80 and a second translating member 84. First and second translating members 80, 84 may comprise generally rectangular or cylindrical bars. Such a design is useful for allowing first and second body portions 30, 40 to translate relative to one another while providing stability to tool 10 as a work function is performed on a wire 20, thereby avoiding undesired nicks and cuts to the wire core 26. First and second translating members 80, 84 may be rigidly coupled to first body portion 30 and be received in or by second body portion 40. In some embodiments, a first translating member aperture 86 and a second translating member aperture 88, as shown in FIG. 5, may receive first and second translating members 80, 84, respectively. Of course, first and second translating members 80, 84 may be rigidly coupled to second body portion 40 and slide within first body portion 30.

First and second translating members 80, 84 may be coupled to first and second body portions 30, 40 by any suitable means, as will be readily understood by those reasonably skilled in the art. In the embodiments shown in FIGS. 2A and 3, first and second translating members 80, 84 are received and fixed into first body portion 30. Second body portion 40 is provided with one or more slots 90, 92 to provide access to first and second translating members 30, 40. Screws 94, 96 are placed into first and second translating members 80, 84, respectively. Thus, first body portion 30 may translate relative to second body portion 40 by first and second translating members 80, 84, but may not be detached from one another without removing screws 94, 96.

The invention also includes a method of performing a work function on wire 20 using any of the various embodiments of tool 10 described above. In some embodiments, the method comprises inserting wire 20 between the first and second sections 54, 58 of the wire engaging portion 50, and translating the first and second body portions 30, 40 towards each other until the first and second sections 54, 58 of the wire engaging portion 50 engage the wire 20. If the tool 10 is provided with wire receiving apertures 70, the wire 20 may be placed into the proper size receptacle and its sheath 24 stripped off, if so desired. If tool 10 is provided with a cutting portion 74, wire 20 may be placed into contact with cutting portion 74 and severed. In some circumstances, it may be desirable to bend wire 20 into a "U" shape before severing. If so provided, the method may also comprise the step of manually engaging the first and second apertures 62, 64 to facilitate the translation of the first and second body portions 30, 40 toward and away from each other to perform a work function.

Thus, embodiments of the wire tool 10 are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A tool useful for performing a work function on a wire, comprising:
    a first body portion defining a first aperture;
    a second body portion substantially equivalent to the first body portion defining a second aperture and substantially translationally coupled to the first body portion with a first translation member and a second translation member; and
    a wire engaging member, wherein the wire engaging member has a first section partially carried on the first body portion and a second section partially carried on the second body portion, and further wherein the first and second sections of the wire engaging member are translated toward each other and can exert compressive force on the wire when the first body portion and the second body portion are translated toward each other, wherein the first and second sections of the wire engaging member define a wire receiving aperture about the longitudinal center line of the tool when the first and second body portions are placed in apposition, wherein the wire engaging member defines at least three wire receiving apertures useful for stripping a sheath from the wire and a cutting portion useful for severing the wire.

2. The tool of claim 1, wherein the first and second sections each define about one half of the wire receiving aperture.

* * * * *